C. W. DAKE.
HEADLIGHT.
APPLICATION FILED JAN. 31, 1914.
1,152,007.
Patented Aug. 31, 1915.
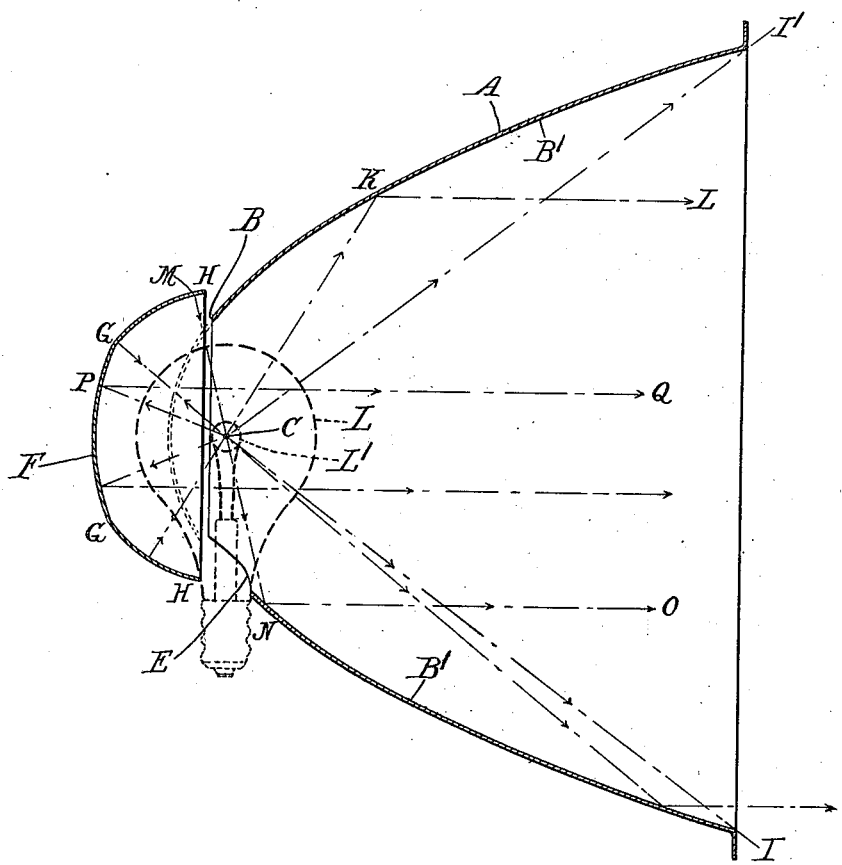
Witnesses.
Edward T. Wray
Geneva Hirth
Inventor.
Charles W. Dake.
by Parker & Burton
Attorneys

UNITED STATES PATENT OFFICE.

CHARLES W. DAKE, OF CHICAGO, ILLINOIS, ASSIGNOR TO PYLE-NATIONAL ELECTRIC HEADLIGHT COMPANY, OF CHICAGO, ILLINOIS, A CORPORATION OF NEW JERSEY.

HEADLIGHT.

1,152,007.                  Specification of Letters Patent.        Patented Aug. 31, 1915.

Application filed January 31, 1914. Serial No. 815,599.

*To all whom it may concern:*

Be it known that I, CHARLES W. DAKE, a citizen of the United States, residing at Chicago, in the county of Cook and State of Illinois, have invented certain new and useful Improvements in Headlights, of which the following is a specification.

When parabolic reflectors are to be used for headlights for locomotives, automobiles and other moving vehicles, it is necessary, in order to project the light to a long distance forward, to use a deep parabolic reflector, in order that a minimum amount of the light may pass out through the front thereof without striking the walls of the reflector and being projected forward in parallel rays; but when such deep parabolic reflectors are used it becomes necessary to place the focus very close to the end wall of the parabola, and this results in heating and destroying the wall of the parabola when an arc lamp is used and when an incandescent lamp is used there is not room for the glass bulb, and it has, therefore, in the past been necessary to use a more shallow reflector than would otherwise have been used.

In my invention I provide means whereby the deep reflector so necessary may be used without interfering with the operation of the lamp and without being damaged thereby.

My invention is illustrated diagrammatically in one form in the accompanying drawing, wherein I have shown in diagrammatic section a headlight reflector in which my system is used.

A is a deep parabolic reflector the rear end of which is truncated and terminates at B.

C is the focus of my reflector, which it will be noted is very close to the bottom of the reflector.

L is an incandescent lamp having a filament L¹ shown diagrammatically by a circle which is at the focal point C. It will be noted that the glass bulb extends back beyond the line where the bottom of the parabola would be located were it not cut away.

E is an aperture in the wall of the parabola through which the lamp support may be inserted.

F is an auxiliary reflector placed back of the parabolic reflector and made up of two separate curved surfaces. The spherical surface GH has for its center the focus C. The parabolic surface GG has for its focus point C. All the light rays which pass out in the angle ICI′ will, of course, not be affected by the reflector and will be diffused in the usual manner. Those rays such as CKL which leave the focus and impinge on the parabolic surface BI will be deflected into parallelism with the axis as indicated. Those rays such as the ray CMN which leave the focus C and strike the spherical mirror GH will be returned back through the focus to impinge as at N on the parabolic surface whence they will be deflected forwardly as at NO. Those rays such as CPQ which pass back to strike the parabolic mirror GG will be deflected forward along the line PQ parallel with the axis of the lines of the two parabolas.

It will be noted that the relative arrangement of the two parabolic and one spherical mirror is such that all those rays which strike the spherical mirror will be reflected back through the focal point along a line which strikes the wall of the main parabolic mirror, and it will be noted that all those rays which strike the smaller parabolic mirror will be deflected forward through the aperture in the end of the larger mirror. Thus a minimum amount of light is wasted by being diffused out though the open mouth of the reflector.

I have shown merely a diagrammatic view of a lighting source. For the sake of convenience I have allowed this to take the form of an incandescent electric light bulb. It is perfectly obvious that it need not be incandescent and that it might be any kind of a light source and that any light source would operate in a suitable and satisfactory manner without departing in any way from the spirit of my invention.

I have not, of course, shown the precise arrangement of brackets, holders and the like in connection either with the support of the headlight or the reflector itself or in connection with the source of light, as these do not form a part of my invention and need not here be discussed.

I claim:

A headlight, comprising a front parabolic reflector having a short focal length and open at both ends, a rear parabolic reflector having a long focal length and at a distance behind the smaller open end of the front reflector, an intermediate reflector formed by a section of a sphere, the three reflectors set so that their foci and center coincide and lie within the front reflector, and a source of light located at such coincident point.

In testimony whereof, I affix my signature in the presence of two witnesses this 26th day of January, 1914.

CHARLES W. DAKE.

Witnesses:
GENEVA HIRTH,
LAUREL M. DOREMUS.